US010698117B2

(12) United States Patent
Asrani et al.

(10) Patent No.: US 10,698,117 B2
(45) Date of Patent: *Jun. 30, 2020

(54) SYSTEMS AND METHODS FOR LOCATION ASSISTANCE WITH PERSONAL AREA NETWORK DEVICES

(71) Applicant: Google Technology Holdings LLC, Mountain View, CA (US)

(72) Inventors: Vijay L. Asrani, San Jose, CA (US); Michael E. Russell, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 15/382,316

(22) Filed: Dec. 16, 2016

(65) Prior Publication Data

US 2017/0160397 A1 Jun. 8, 2017

Related U.S. Application Data

(63) Continuation of application No. 14/050,753, filed on Oct. 10, 2013, now Pat. No. 9,535,164.

(51) Int. Cl.
 *G01S 19/25* (2010.01)
 *G01S 19/06* (2010.01)
 *G01S 19/48* (2010.01)
 *G01S 5/00* (2006.01)

(52) U.S. Cl.
 CPC .......... *G01S 19/252* (2013.01); *G01S 5/0027* (2013.01); *G01S 5/0072* (2013.01); *G01S 19/06* (2013.01); *G01S 19/48* (2013.01)

(58) Field of Classification Search
 CPC ...... G01S 5/0072; G01S 19/06; G01S 19/252; G01S 19/48; G01S 5/0027

USPC .................................................. 342/357.64
See application file for complete search history.

(56) References Cited

U.S. PATENT DOCUMENTS

| 6,373,430 B1 | 4/2002 | Beason et al. |
| 6,504,503 B1 | 1/2003 | Saint-Hilaire et al. |
| 7,084,809 B2 | 8/2006 | Hockley, Jr. et al. |
| 7,149,534 B2 | 12/2006 | Bloebaum et al. |

(Continued)

FOREIGN PATENT DOCUMENTS

GB 2476718 A 7/2011

OTHER PUBLICATIONS

Prosecution History from U.S. Appl. No. 14/050,753, dated Jun. 29, 2016 through Aug. 26, 2016, 14 pp.

*Primary Examiner* — Dao L Phan
(74) *Attorney, Agent, or Firm* — Shumaker & Sieffert, P.A.

(57) ABSTRACT

Implementations relate to systems and methods for location assistance using devices (104) in a personal area network (PAN). In one scenario, a user may use two separate location-enabled devices, such as a wearable personal device (102) and a cellular telephone device (104). In cases, one of those devices may have reached a higher or farther-developed state in terms of generating or storing location information (108) for the user's current position, as compared to the opposite device. This can take place, for instance, when the first (e.g. wearable) device (102) is first turned on. The two devices use platforms and techniques to exchange location information and carry out GPS or other operations to furnish the device that is lagging in position processing progress with assistance which will speed up or otherwise enhance the position fix for that device.

19 Claims, 4 Drawing Sheets

(56) References Cited

U.S. PATENT DOCUMENTS 9,535,164 B2 1/2017 Asrani et al.
2011/0163914 A1 7/2011 Seymour

| STATE | DATA |
|---|---|
| HOT | VALID 1) TIME, AND<br>VALID 2) BROADCAST EPHEMERIS |
| WARM | ANY OF:<br>1) VALID TIME WITHOUT BROADCAST EPHEMERIS<br>2) ESTIMATED EPHEMERIS (REGARDLESS OF TIME)<br>3) BROADCAST EPHEMERIS WITHOUT VALID TIME |
| COLD | INVALID 1) TIME, AND<br>INVALID 2) EPHEMERIS, AND<br>INVALID 3) POSITION |

*FIG. 2*

SYSTEMS AND METHODS FOR LOCATION ASSISTANCE WITH PERSONAL AREA NETWORK DEVICES

CROSS-REFERENCE TO RELATED APPLICATIONS

This application is a continuation of U.S. application Ser. No. 14/050,753, filed Oct. 10, 2013, the entire contents of which is herein incorporated by reference.

FIELD

The present teachings relate to systems and methods for location assistance using two or more personal area network (PAN) devices, and more particularly, to platforms and techniques for allowing one device equipped with a Global Navigation Satellite System (GNSS) to communicate with another device having positioning capabilities in order to speed up the acquisition of location information, and the generation of a position fix.

BACKGROUND

In the field of personal electronic devices, certain recreational devices and services capture and present a user's geographic position using a GNSS receiver. As one example, a sports watch or other wearable device may contain, for instance, a Global Positioning System (GPS) chip or module to allow that device to receive signals from GPS satellites, go through the necessary computation of ephemeris and other data, and produce a GPS position "fix," or precise location reading, often including geocoordinates (latitude, longitude, and optionally altitude) and direction of travel.

When a sports watch or other personal device with a GNSS receiver has first been turned on, or has recently started receiving usable GPS signals (e.g., after being obscured by trees or buildings), the GPS receiver needs a certain amount of time to re-start and begin taking position fixes. That start-up delay can be on the order of several minutes. During that start-up period, the device will typically consume a significant amount of battery power, because a significant amount of radio frequency reception and position computation activity must take place.

In those scenarios and others, a GPS or other GNSS-equipped personal device could benefit by tapping the already-generated location information of a nearby device, if that nearby device is GNSS-equipped and is located in range of a wireless connection to the personal device.

BRIEF DESCRIPTION OF DRAWINGS

The accompanying drawings, which are incorporated in and constitute a part of this specification, illustrate implementations of the present teachings and together with the description, serve to explain the principles of the present teachings. In the figures:

FIG. 2 illustrates various location processing states and associated data that a device can occupy and use, according to various implementations.

DETAILED DESCRIPTION OF IMPLEMENTATIONS

Implementations of the present teachings relate to systems and methods for location assistance using personal area network devices. More particularly, implementations relate to platforms and techniques for establishing a short-range communication link between a first device and a second device, and allowing the two devices to exchange location information to determine whether one device or the other has more up-to-date location information. If so, the more up-to-date information can be shared with the remaining device to speed up position processing on that remaining device.

Reference will be made in detail to exemplary implementations of the present teachings, which are illustrated in the accompanying drawings. Where possible, the same reference numbers will be used throughout the drawings to refer to the same or like parts.

Figure 1:
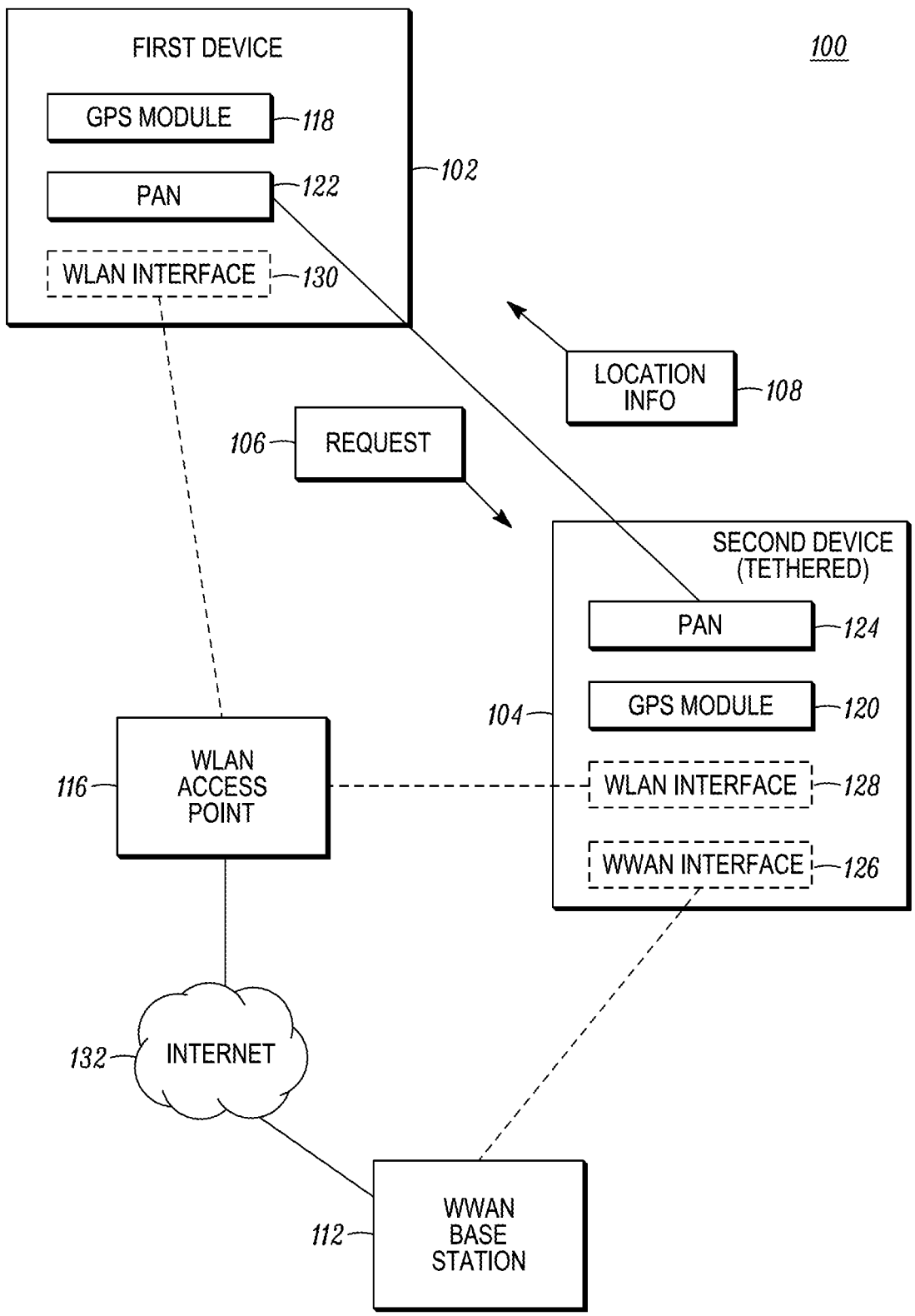
FIG. 1 illustrates an overall environment which can be used in systems and methods for location assistance using tethered devices, according to various implementations.

FIG. 1 illustrates an overall environment 100 in which systems and methods for location assistance using personal area network (PAN) devices can operate, according to aspects of the disclosure. As shown, a first device 102 and a second device 104 can operate in proximity to each other. The first device 102 can be or include a personal electronic device equipped with a GPS module 118, which can be or include a GPS radio frequency chip, software to acquire GPS data, and/or other GPS-related resources. While some implementations employ a GPS-based service, it will be appreciated that other GNSS systems can be used, such as, for example, a GLONASS-based system, a Galileo-based system, a Beidou-based system, and/or others.

The first device 102 can include a processor, memory, software, and/or other hardware, software, or service resources. The first device 102 can, in implementations, be or include a wearable device, such as a watch or glasses, a device which can be clipped to a belt or worn on a strap, and/or other mobile, portable, and/or wearable components. In implementations, the first device 102 may not be equipped with a wireless wide area network (WWAN) transceiver and thus lacks cellular and WiMAX capability. The first device 102 may, however, be equipped with a wireless local-area network (WLAN) interface 130. The WLAN interface 130 can be or include a WiFi module or chip configured to support data communications with an access point 116 associated with a home, business, or other wireless local area network (WLAN). It will be understood, however, that the WLAN interface 130 and WiFi™ or other WLAN connectivity are optional components of the first device 102.

The first device 102 can further be equipped with a personal area network (PAN) interface 122. The PAN interface 122 can be or include any short-range communications link, such as, for example, a Bluetooth™ or WiFi Direct™ interface, an NFC interface, another type of short-range radio frequency link, an optical link, an audio-data link, a USB cable, or the like.

In implementations as shown, a second device 104 can operate in the same environment 100 as the first device 102, for instance, in the same general proximity as, or held by the same user operating, the first device 102. The distance between the first device 102 and the second device 104 can be within a range of error of the GNSS of the first device 102, which can be on the order of a few centimeters, a few decimeters, a few meters, or other distances, depending on the GNSS and its implementation in the first device 102. The second device 104 can be or include a personal electronic device equipped with a GPS module 120 that can likewise be or include a GPS chip, software, and/or related resources. It will be understood, again, that other GNSS-based modules or resources can be used instead of GPS modules or resources. The second device 104 can similarly include a processor, memory, software, and/or other hardware, software, or service resources. The second device 104 can include a personal area network (PAN) interface 124 compatible with the PAN interface 122 of the first device 102, which can similarly be or include a Bluetooth™ interface, a WiFi Direct™ interface, or other type of short-range radio frequency or other communications link.

In implementations, the second device 104 can, in addition to the noted GPS and short-range communication capabilities, also be equipped with a wireless wide-area network (WWAN) interface 126. The WWAN interface 126 can be or include a cellular module or chip or other resources, configured to support wireless voice and/or data communications with a base station 112 associated with a wide area network, such as a 4G LTE (Long Term Evolution), 3G CDMA (Code Divisional Multiple Access), 2G GSM (Global System for Mobile Communications), WiMAX (IEEE 802.16), and/or other cellular or wireless wide area network.

In implementations, the second device 104 can, further, be equipped with a wireless local area network (WLAN) interface 128. The WLAN interface 128 can be or include a WiFi™ module or chip configured to permit data communications with an access point 116, such as an access point 116 operating under an IEEE 802.11 or other wireless local area network standard. In the example of FIG. 1, both devices 102, 104 have WLAN interfaces 130, 128 and are wirelessly communicating with the same WLAN access point 116. In situations where both devices have active WLAN interfaces, they may wirelessly communicate with the same or different WLAN access points. Note that the WLAN interface 128 and WiFi™ or other WLAN connectivity, along with the WWAN interface 126 and 4G and/or other connectivity, are optional components of the second device 104. While those types or classes of networking connections or resources are optional in the first device 102 and the second device 104, in both devices, in general, a PAN interface and GNSS-based interface will be incorporated, as shown.

In aspects, the second device 104 can be referred to as the "tethered" device, but it will be appreciated that in a given situation, either of first device 102 or second device 104 can act to support and feed location information to the opposite device, and serve as the tethered unit.

In the environment 100 as shown, the first device 102 and second device 104 can, in general, communicate and cooperate to exchange location information related to the position of each device, and attempt to use that information to accelerate, advance, speed up, shorten, or otherwise enhance or improve the process of generating a position fix of one or the other device. The generated position fix may include: geocoordinates such as latitude, longitude, and optionally altitude; direction of travel; ground speed; vertical speed; accuracy information for any of these elements; and the precise method used to compute the position fix. In aspects, and again merely generally, logic built into the first device 102 and second device 104 can operate to identify which of the first device 102 and second device 104 is "ahead" of the other device in terms of acquiring location information and/or performing calculations on that location information to acquire a position fix. The device in that "ahead" state can then pass its location information to the other device to assist the "behind" device in completing position operations of its own.

In general terms, as also shown in FIG. 1, a user can turn on, activate, and/or operate the first device 102 in an already-powered state, and the first device 102 can initiate a series of exchanges with the second device 104 as a tethered device to determine whether the second device 104 can assist the first device 102 by providing location information in a manner that will speed up the process of generating that position fix in the first device 102. While further details are described in connection with FIG. 3, in general, the first device 102 can issue a request 106 and/or other message or query to the second device 104 via the short-range communication link established between the respective PAN interface 122 and PAN interface 124. If the logic or processing followed by the first device 102 and second device 104 indicates that the second device 104 is capable of speeding up the location operations of the first device 102, the second device 104 can, in general, respond with a transmission of location information 108 from the second device 104 to the first device 102. The first device 102 can then use the location information 108 to speed up, accelerate, and/or otherwise enhance or improve the calculation of a position fix by the first device 102.

In aspects, the location information 108 can relate to any aspect of GNSS-based or other data stored or generated by the second device 104 that can be used by the first device 102 to improve the computation of the position of the first device 102. In the case of GPS data, the location information 108 can include time information, which can include time synchronization data used on time signals arriving from GPS satellites, and for other purposes. The location information 108 can also include almanac information which describes orbital information for the fleet of GPS satellites as a whole with relatively coarse accuracy, which may be valid or accurate for weeks or months. The location information 108 can also include ephemeris information, which allows the fine-grained calculation of the position of each satellite in orbit to necessary precision, and which may remain accurate for approximately two to four hours after that information is downloaded from a satellite.

Other types of information can be included in the location information 108 to assist the determination of position by the first device 102, and those other types of information can include, for example, estimated values for position, time, ephemeris, and/or other quantities related to position processing that are available to the second device 104. Those further types of data can include position estimates based on the latitude, longitude, and/or altitude values for the device 104 or for fixed points such as the base station 112 and/or access point 116. The location information 108 can likewise include time estimates, as well as estimated ephemeris data that are available to the second device 104, such as from the base station 112, the access point 116, servers in the wireless wide area network, servers in the Internet 132, and/or other sources. Any or all of those other types of location information can be used to assist the positioning process used by the first device 102 to generate a position. In general, the amount, currency, and degree of precision available to each of the first device 102 and the second device 104 allows the two devices to determine whether each one is in a cold, warm, or hot location processing state, indicating the validity or currency of the location information 108 available to each device and which can be shared to or from each device.

According to implementations, and as shown in FIG. 2, in general a "hot" location processing state occupied by either of the first device 102 or second device 104 indicates that that device has valid or current data for both time and broadcast ephemeris, which in general may allow immediate or rapid calculation of a position fix.

In general, a "warm" location processing state can reflect any one of a set of states wherein time data is valid without valid broadcast ephemeris data, or where estimated ephemeris data is available (regardless of valid time), or where valid broadcast ephemeris data is available without valid time data.

A "cold" location processing state can indicate that the device has no valid data available to it, such as when the device is first turned on and has not begun location processing, or when the device enters a reboot state following a fault or other condition. For convenience of reference, any state besides a "hot" state can be referred to as a "non-hot" state herein.

GPS processing can, in general, depend on whether a device is in a cold, warm, or hot location processing state. According to implementations, a device 102, 104 can enter or activate a cold state upon power-up or wake-up. A cold start can be performed every time after the device and/or its GPS module is turned off without storage of location information in a persistent memory (e.g., when no backup power supply is connected). During a cold start, almanac and ephemeris data have to be downloaded first from the GPS satellites to the device GPS module before a position fix can be acquired.

Assuming that location information is stored when a GPS module is powered off (e.g., a proper backup power source is provided), a device 102, 104 can perform a hot start (provided valid time data is available) if the associated GPS module is powered on within a predetermined time frame (e.g., two hours) after the device and/or GPS operations were previously turned off. This is the case because accurate ephemeris and almanac data can be retrieved from flash or other memory of the GPS module.

A warm start, in general, can be performed if the device and/or associated GPS module stores previous location information and is started after a predetermined (e.g., two hour) time frame, as some but not all of the GPS satellite data has to be refreshed.

The first device 102 and second device 104 can use comparative information about those associated location processing states to exchange location information 108 useful to one or the other device to speed up location processing, as described herein.

Figure 3:
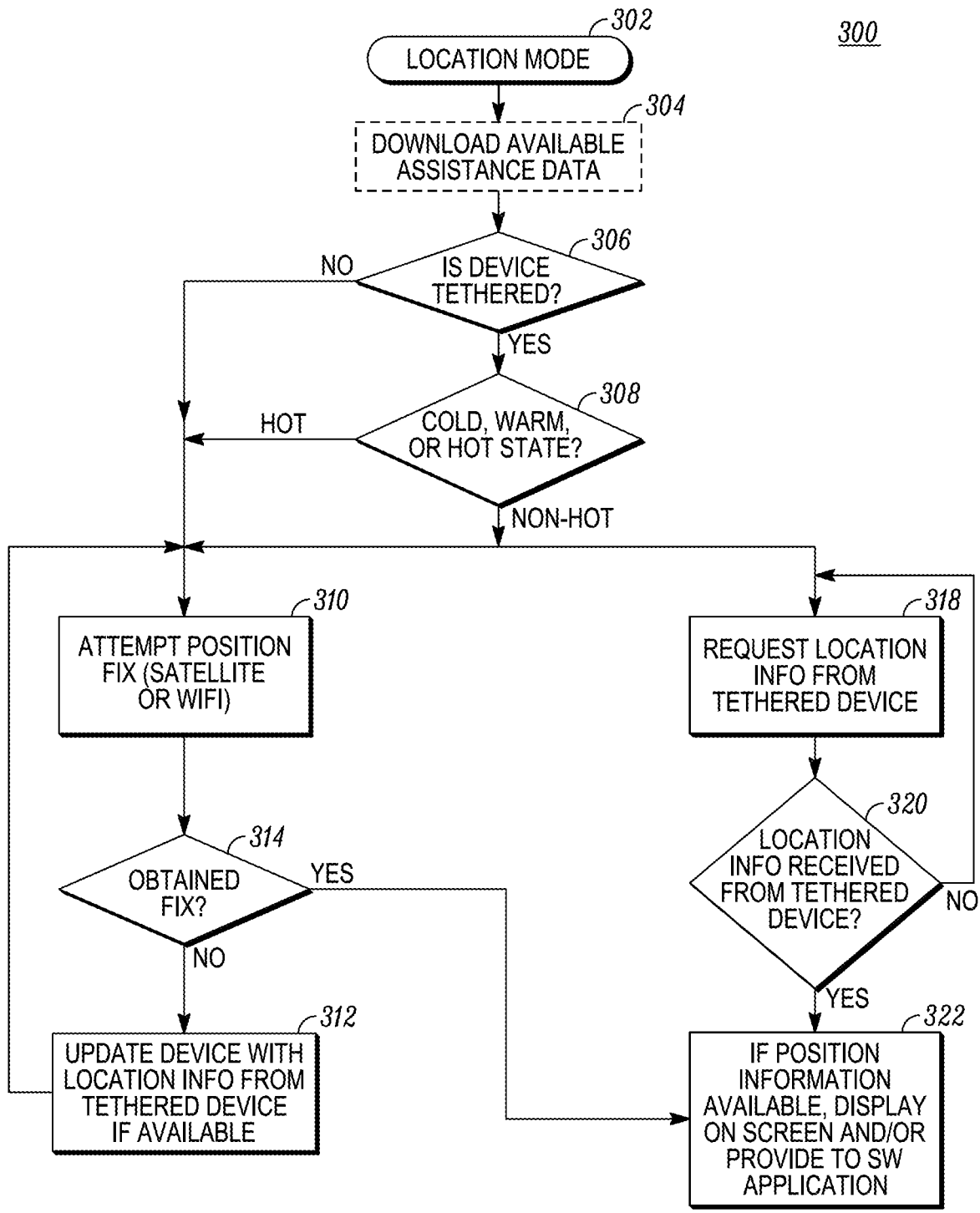
FIG. 3 illustrates a flowchart of comparative state and location assistance processing, according to various implementations.

More specifically, processing to compare location processing states and exchange data can be carried out using a process 300, such as shown in FIG. 3. Processing begins when a first device 102, 104 enters a location mode 302. Although any device in a personal area network can enter the location mode and start this process 300, for the sake of clarity, this description will consider the first device 102 as the subject device and consider the second device 104 as one of the tethered devices in the PAN. If supported, the first device 102 (as the subject device) can download 304 using a WLAN or WWAN communication link and/or generate any assistance data that may be initially available, such as predicted ephemeris data. In many smartphone devices, location assistance data is generally downloaded at least once a day from a WWAN base station 112 to help speed up the process of obtaining position fixes. Information provided at a frequency of once a day generally reflects estimated ephemeris data generated by an associated server. Estimated (or predicted) ephemeris data can be or include client/server-generated ephemeris data for GPS satellites, which can be valid for a certain period of time, such as 7-10 days. The assistance data can likewise or instead include broadcast ephemeris data, such as ephemeris data transmitted by GPS satellites, which may or may not be slightly out of date but remembered by the first device 102. Information provided at a frequency of more than once a day generally reflects broadcast ephemeris data requested from, or received by way of, a WWAN base station 112. In implementations, assistance data can also or instead be downloaded to a smartphone or other device each time a location-based application (e.g., navigation, mapping, etc.) is launched.

The first device can determine 306 whether a second device 104 is connected or tethered to the first device 102 over a short-range communication network (e.g., via the PAN interface 122 and PAN interface 124). If the determination 306 is no, processing proceeds to branch 310 alone, and the first device attempts to obtain a position fix on its own, as will be explained later in more detail.

If the determination 306 is yes, processing can proceed to another determination 308 of whether the first device 102 is in a hot, warm, or cold location processing state, as defined herein. If the determination 308 is that the first device 102 is in a hot state, processing also proceeds to branch 310 alone. In other words, processing proceeds to branch 310 alone when no tethered second device is available (i.e., via determination 306 NO) and when a tethered second device is available but the first device already has both valid time and valid broadcast ephemeris data (i.e., via determination 308 HOT).

If the first device 102 is tethered to a second GNSS device and in a NON-HOT state, however, processing proceeds to both branches 310 and 318 in parallel using both a stand-alone positioning process in first device 102, and attempted assistance from the second device 104.

Continuing with branch 318, which occurs in a parallel or concurrent fashion with branch 310 when the first device 102 is tethered to a second device 104 and in a NON-HOT state, the first device 102 can transmit 318 a request 106 to the second device 104 and request location information 108 from the second device 104. The request may ask for any available location information such as time information, estimated time information, time synchronization data, almanac information, ephemeris data, estimated ephemeris data, position information, and/or estimated position information. Alternately, the request may ask for specific information such as any available time information (actual or estimated), ephemeris data (actual or estimated), and position information (actual or estimated).

A determination can be made whether location information 108 has been received 320 by the first device 102 from the second device 104. Location information may not be received if there are communication issues within the PAN, or if the second device 104 is also in a cold state and has no valid time, ephemeris, or position information. If no location information has been received 320, processing can enter a loop back to the request 318 until location information 108 is received by the first device 102 from the second device 104. In implementations, a timer and time-out condition can be added to the loop back and/or the received 320 determination to avoid endless loops, race conditions, or other faults.

If location information was received 320 by the first device 102 from the second device 104, any available position information (actual or estimated) from the second device can be displayed 322 on the first device 102 and/or provided to one or more software applications operating on the first device 102, such as mapping, navigation, and location-based services software applications. Any received location information is now available to branch 310 to be carried out by first device 102, as will be explained below.

After the tethering and location processing state determinations 306, 308, the first device 102 initiates an attempt 310 to acquire a position fix using its GPS module 118. Note that branch 310 occurs regardless of whether the first device 102 is tethered (or not) and regardless of location processing state. The position fix process can be initiated using GPS signals, and/or can be made using a WLAN service, such as a WiFi™ connection, via the WLAN interface 130. A determination can be made whether a position fix 314 has been obtained. If the GNSS receiver reaches a determination that a position fix 314 has not been obtained, the first device 102 checks to see if location information from a tethered device was received and updates 312 its own location information, if any tethered device location information was received. Then, the process returns to branch 310 to attempt a position fix again. Note that, if the first device is traversing branch 310 alone, no tethered device location information will be requested or received because only branch 318 requests tethered device location information.

If a position fix has been obtained 314, the position fix and/or position information portions of the location information 108 can be displayed 322 on a display screen of the first device 102, and/or provided to one or more software applications operating on the first device 102, such as mapping, navigation, and location-based services software applications.

This type of location mode as describe with reference to FIG. 3 allows a GNSS-enabled first device 102 with a PAN transceiver to request and use location information from a nearby PAN-connected GNSS device. This supports a faster position fix for the first device 102. Note that, for a PAN network with two or more GNSS-equipment devices, each device may consider itself the first GNSS device and each implement a process similar to FIG. 3 to request location information from one or more of the tethered GNSS devices in the PAN. In implementations, it may be noted that the capture of broadcast ephemeris data by the first device 102 or second device 104 may be more advantageous than other types of data, since decoding broadcast ephemeris data requires a higher signal to noise ratio (SNR), 14 dB or more, than decoding and/or aligning time data (part of the PRN code in GPS systems).

Figure 4:
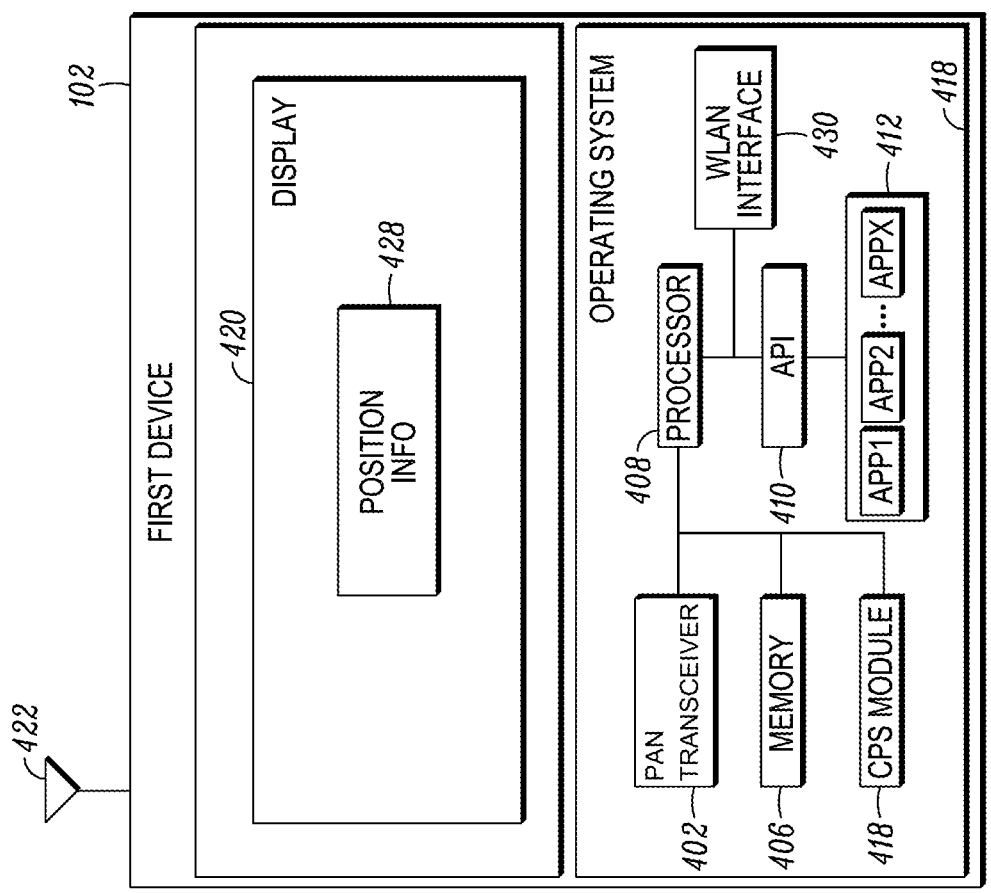
FIG. 4 illustrates various hardware, software, and other resources that can be used in a position-enabled device, according to various implementations.

FIG. 4 illustrates exemplary hardware, software, and other resources that can be used in various implementations of location assistance using tethered devices. In implementations as shown, the first device 102 can include a hardware platform including processor 408 communicating with memory 406, such as electronic random access memory, operating under control of or in conjunction with the operating system 418. The operating system 418 can be, for example, a distribution of the Android™ operating system available from Google, Inc., Mountain View, Calif., a distribution of the Linux™ operating system, the Unix™ operating system, or other open-source or proprietary operating system or platform. The first device 102 can operate to generate and display position information 428 on a display 420 in conjunction with mapping, navigation, or location-based services software applications, using platforms and techniques described herein.

The processor 408 can further communicate with a PAN transceiver 402, via which the electronic device 102 can transmit or receive wireless signals using antenna element 422, and using those signals establish a connection to one or more networks (not shown), such as the Internet or other public or private networks. In some implementations, the connection to the one or more networks via the antenna element 422 and other resources can be or include a broadband wireless connection, a WiFi™ connection via WLAN interface 430, and/or wireless data connection (not shown). It may be noted that the WLAN interface 430 is optional (see FIG. 1 elements 128, 130) and can be removed in some implementations, and that a wireless wide area network (WWAN) interface can be optionally be included or added (see FIG. 1 element 126). Likewise, while radio frequency wireless connections are described, it will be appreciated that first device 102 can also connect with one or more networks, access points, and/or services via wired or other types of wireless connections, such as Ethernet™ connections, USB connections, infrared connections, or others.

The processor 408 can, in general, be or include one or more general-purpose and/or special-purpose processors, cores, and/or related logic, and can be programmed or configured to execute and/or control the operating system 418, a set of system resources including an application programming interface (API) 410, a set of applications 412 such as mapping, navigation, or location-based services applications, and/or other hardware, software, logic, services, and/or resources. Other configurations of the first device 102, associated network connections, and other hardware, software, and other resources or services are possible. In implementations, the second device 104 can be or include the same or similar hardware, software, and service resources as the first device 102, or in implementations can be or include different or additional hardware, software, and/or services.

The foregoing description is illustrative, and variations in configuration and implementation may occur to persons skilled in the art. For example, while implementations have been described in which the first device 102 communicates with one additional device in the form of the second device 104 to generate improved or accelerate position fixes, in implementations, the first device 102 can communicate with two or more additional devices to achieve the same enhanced operations. Similarly, the location assistance provided by the second PAN-connected GNSS device 104, or two or more additional PAN-connected GNSS devices or sources, can be used to generate enhanced or speeded-up position fixes by more than one GNSS device in a cold or otherwise less-advanced location processing state. Other resources described as singular or integrated can in implementations be plural or distributed, and resources described as multiple or distributed can in implementations be combined. The scope of the present teachings is accordingly intended to be limited only by the following claims.

What is claimed is:
1. A method comprising:
  initiating, by a wearable device, a positioning process for determining a location of the wearable device, wherein the wearable device is connected to another device via a personal area network connection;
  determining, by the wearable device, an initial location of the wearable device;
  sending, by the wearable device, to the other device, and using the personal area network connection, a request for location information;

receiving, by the wearable device and from the other device, the location information; and generating, by the wearable device and based in part on the location information received from the other device and the initial location, position information for the wearable device.

2. The method of claim 1, wherein determining the initial location of the wearable device comprises determining the initial location using at least one of a global navigation satellite system-based process, an assisted global navigation satellite system-based process, a radio triangulation-based process, a cellular-network based process, or a process based on a detected location of a wireless access point used by the first device.

3. The method of claim 1, wherein the request for location information includes a request for at least one of time data from the other device, ephemeris data from the other device, or position data from the other device.

4. The method of claim 3, wherein the ephemeris data comprises estimated ephemeris data.

5. The method of claim 3, wherein the ephemeris data comprises broadcast ephemeris data.

6. The method of claim 3, wherein the position data comprises estimated position data.

7. The method of claim 6, wherein the estimated position data comprises position data estimated by at least one of cellular base station trilateration, wireless local area network access point trilateration, or global navigation satellite system trilateration.

8. The method of claim 1, wherein initiating the positioning process is in response to initiating one of a start-up process of the wearable device or a wake-up process of the wearable device.

9. The method of claim 1, wherein the other device comprises one of a cellular telephone having a global navigation satellite system module, a navigation device having a global navigation satellite system module, or a computing device having a global navigation satellite system module.

10. A wearable device, comprising:
a global navigation satellite system module; and
a processor communicatively coupled to the global positioning system module, the processor being configured to:
initiate a positioning process for determining a location of the wearable device, wherein the wearable device is connected to another device via a personal area network connection;
determine, using the global navigation satellite system module, an initial location of the wearable device;
send, to another device and using the personal area network connection, a request for location information;
receive, from the other device, the location information; and
generate, based in part on the location information received from the other device and the initial location, position information for the wearable device.

11. The wearable device of claim 10, wherein the processor is further configured to:
determine the initial location of the wearable device using at least one of a global navigation satellite system-based process, an assisted global navigation satellite system-based process, a radio triangulation-based process, a cellular-network based process, or a process based on a detected location of a wireless access point used by the first device.

12. The wearable device of claim 10, wherein the request for location information includes a request for at least one of time data from the other device, ephemeris data from the other device, or position data from the other device.

13. The wearable device of claim 12, wherein the ephemeris data comprises estimated ephemeris data.

14. The wearable device of claim 12, wherein the ephemeris data comprises broadcast ephemeris data.

15. The wearable device of claim 12, wherein the position data comprises estimated position data.

16. The wearable device of claim 15, wherein the estimated position data comprises position data estimated by at least one of cellular base station trilateration, wireless local area network access point trilateration, or global navigation satellite system trilateration.

17. The wearable device of claim 10, wherein the processor is configured to initiate the positioning process by at least being configured to initiate the positioning process in response to initiating one of a start-up process of the wearable device or a wake-up process of the wearable device.

18. The wearable device of claim 10, wherein the global navigation satellite system module comprises at least one of a global positioning system module, a global navigation satellite system module, a Galileo module, or a Beidou module.

19. The wearable device of claim 10, wherein the other device comprises one of a cellular telephone having a global navigation satellite system module, a navigation device having a global navigation satellite system module, or a computing device having a global navigation satellite system module.

* * * * *